United States Patent [19]
Rauscher

[11] 3,867,694
[45] Feb. 18, 1975

[54] MONITORING CIRCUITRY FOR AMPLITUDE-MEASURING SYSTEM

[75] Inventor: Werner Rauscher, Reutlingen, Germany

[73] Assignee: Wandel u Goltermann, Reutlingen, Muhleweg, Germany

[22] Filed: Oct. 9, 1973

[21] Appl. No.: 404,678

[30] Foreign Application Priority Data
Oct. 12, 1972 Germany............................ 2249928

[52] U.S. Cl.................................. 324/102, 324/118
[51] Int. Cl....................... G01r 19/16, G01r 19/22
[58] Field of Search........ 324/118, 114, 102, 103 P, 324/99 D, 77 A

[56] References Cited
UNITED STATES PATENTS
3,714,569  1/1973  Bruning, Jr. et al. ............. 324/99 D
3,783,379  1/1974  Nestorovic ..................... 324/103 P

*Primary Examiner*—Alfred E. Smith
*Assistant Examiner*—Ernest F. Karlsen
*Attorney, Agent, or Firm*—Karl F. Ross; Herbert Dubno

[57] ABSTRACT

A system for monitoring the amplitude levels of signal channels in a manually or automatically explored frequency band includes a monostable multivibrator (monoflop) controlled by a voltage comparator which responds to signal levels exceeding a predetermined threshold. During its off-normal period, the monoflop energizes an indicator lamp through an OR gate also receiving the comparator output so that the lamp remains lit for at least a minimum period upon each sweep of a frequency selector across a signal channel of elevated amplitude level.

7 Claims, 1 Drawing Figure

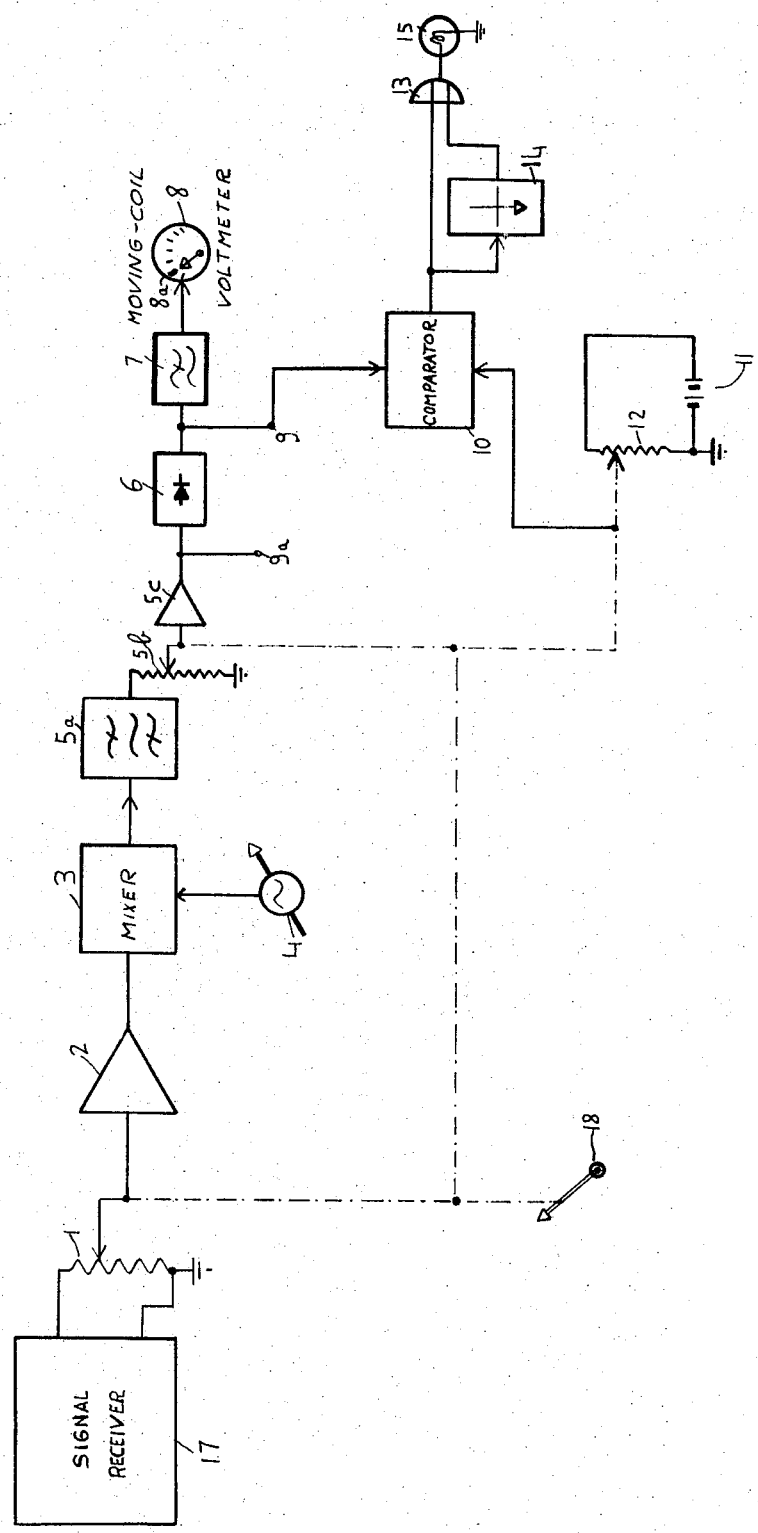

MONITORING CIRCUITRY FOR AMPLITUDE-MEASURING SYSTEM

FIELD OF THE INVENTION

My present invention relates to a system for monitoring the amplitude levels of signal channels located within a predetermined frequency band which may be explored manually or automatically to ascertain the degree of activity of any such channel.

BACKGROUND OF THE INVENTION

If a measuring instrument such as a moving-coil voltmeter is connected to the output of a signal receiver which is progressively tuned to different input frequencies within the monitored band, an active channel encountered in the frequency sweep gives rise to an output signal deflecting the pointer of the meter; such deflection may indicate the presence of a signal amplitude exceeding a critical level which may be preset with the aid of a threshold circuit so as to lie above the noise level of the transmission system. If the instrument has appreciable inertia and if the bandwidth of the receiver is narrow, the deflection of the pointer will be observable only if the sweep rate is relatively low; this bandwidth, of course, is determined by the desired degree of resolution or minimum separation of the individually detectable signal frequencies (e.g., carriers) which may be referred to as the spectral lines of the band.

In order to maximize the number of spectral lines discoverable by this procedure, it is customary to raise the selectivity of the monitoring system to a point at which the receiver is not quite saturated by the background noise but is overdriven by the useful signals. This causes maximum energization of the measuring instrument but does not significantly increase the allowable sweep rate if the signal-to-noise ratio is low. The latter condition frequently prevails in the case of carrier-frequency telecommunication systems in which a multiplicity of active channels are to be monitored to determine the existence of overvoltages which may exceed the normal message level by only a few dB.

If, in such a case, the receiver has an output voltage indicating a signal amplitude of a magnitude in the critical range, the pointer of the voltmeter is deflected but does not indicate the true value of this amplitude. Thus, it becomes necessary to reduce the input voltage to the receiver (or to some intermediate stage thereof) in order that this value can be correctly read on the meter; this operation is time-consuming and causes considerable wear of the switching elements involved.

OBJECTS OF THE INVENTION

The general object of my present invention is to provide means in such a monitoring system for extending the minimum length of time during which an indication of a critical signal amplitude is given, regardless of the sweep rate and its relationship to the bandwidth of the receiver.

A related object is to provide a system of this nature whose receiver can be operated on a linear part of its characteristics, i.e., without saturation, with signal amplitudes in at least the lower part of the critical range so as to avoid the need for a switchover upon every deflection of the pointer of the measuring instrument.

SUMMARY OF THE INVENTION

I realize these objects, in conformity with my present invention, by the provision of an electronic pulse generator, such as a monostable multivibrator or monoflop, connected to the output of a voltage comparator for producing a monitoring pulse of predetermined duration whenever the comparator detects a voltage in the receiver output which exceeds a constant reference voltage emanating from a threshold circuit. An indicator, such as a lamp, connected to the pulse generator registers the presence of the monitoring pulse and apprizes the operator that a signal amplitude in the critical range has been detected.

Since the energization of the indicator lasts for a time which is independent of the length of the interval during which the signal voltage appears in the output of the receiver, even a brief presence of such a signal voltage will suffice to attract the operator's attention.

If the sweep is slow or is halted upon the lighting of the indicator lamp, the output voltage of the receiver will remain above the threshold. Since the monitoring pulse is invariably terminated after a limited period, it is desirable to continue the indication of the presence of that output voltage by keeping the lamp energized. For this purpose, in accordance with a further feature of my invention, I prefer to connect the lamp (or its equivalent) through an OR gate to the output of the pulse generator and also to the output of the voltage comparator whereby the operation of the indicator is extended beyond the end of the monitoring pulse.

If the receiver is overdriven by a particularly high signal amplitude, or if the pointer of the associated voltmeter is deflected to the end of its scale by the resulting output voltage, the signal level in the receiver input and/or in some interstage coupling thereof may be stepped down by a switch which at the same time commensurately lowers the reference voltage of the threshold circuit. The normal reference voltage should be so chosen as to lie at a fractional value of the voltmeter scale, e.g., at the 10 percent point as counted from the lower end of that scale. This ensures that a wide range of signal amplitudes can be read directly on the meter without requiring a switchover to the lower signal and threshold levels.

BRIEF DESCRIPTION OF THE DRAWING

The above and other features will now be described in detail with reference to the sole FIGURE of the accompanying drawing which represents a circuit diagram of a monitoring system according to my invention.

SPECIFIC DESCRIPTION

The system shown in the drawing comprises a signal receiver 17 which may be a terminal of a multichannel carrier-type telecommunication (e.g., telephone) system. Receiver 17 works into a potentiometer 1 across which there is developed a carrier-frequency voltage which can be selectively stepped down before being fed via an amplifier 2 to a mixer 3 also receiving a variable frequency from a tunable local oscillator 4. The heterodyning of the incoming carrier frequency with the locally generated frequency produces an intermediate frequency which clears a bandpass filter 5a; the tuning control of oscillator 4 acts as a selector for the carrier frequency to be monitored as is well known per se. The amplitude of the intermediate-frequency signal is reduced in another potentiometer 5*b* feeding, through an amplifier 5*c*, a detector 6 deriving an audio voltage from the envelope of the amplitude-modulated carrier and intermediate frequencies. This audio voltage is transmitted on the one hand, via a low-pass filter 7, to a moving-coil voltmeter 8 and on the other hand to a terminal 9 connected to one input of a comparator 10 whose other input receives a constant reference voltage from a threshold circuit here shown to comprise a battery 11 and a further potentiometer 12.

In accordance with my present invention, the output of comparator 10 is applied to a monoflop 14 and, in parallel therewith, to an OR gate 13 also receiving a pulse from the monoflop in the off-normal condition thereof into which it is tripped whenever the output voltage on terminal 9 exceeds the reference voltage tapped off the potentiometer 12. OR gate 13, when conducting, energizes an indicator lamp 15 to apprize the operator that the amplitude of a carrier selected with the aid of oscillator 4 is in the critical range. The value of this amplitude can then be read directly on the voltmeter 8 whose pointer stands on a mark 8*a* near the lower end of its scale whenever the voltages fed to comparator 10 are equal to each other.

When the output of comparator 10 changes from zero to a finite value, monoflop 14 is triggered and remains off-normal for a predetermined length of time while lighting the lamp 15. When the monoflop returns to normal, the lamp remains lit if the comparator output is still finite, i.e., has the binary value 1. In some instances, especially with fast-responding comparators and with relatively low intermediate frequencies, the upper input of the comparator may be connected to an output terminal 9*a* of amplifier 5*c* rather than to output terminal 9 of detector 8.

A switch 18, which may be manually operated, is connected to the sliders of potentiometers 1, 5*b* and 12 to displace them in unison for reducing the signal amplitude to a suitable value in the event of an excessive deflection of the pointer of instrument 8 in the illustrated normal switch position. The simultaneous reduction of the reference voltage from potentiometer 12 causes the lamp 15 to stay lit in any position of switch 18.

I claim:

1. A system for monitoring the amplitude levels of signal channels located within a predetermined frequency band, comprising:
   receiver means for signal frequencies within said band;
   selector means for progressively tuning said receiver means to different signal frequencies and for generating output voltages proportional to the amplitudes thereof;
   threshold means for providing a constant reference voltage;
   comparator means connected to said receiver means and to said threshold means;
   a monostable multivibrator controlled by said comparator means for producing a monitoring pulse of predetermined duration upon detection of an output voltage exceeding said reference voltage;
   indicator means connected to said multivibrator for registering the presence of said monitoring pulse; and
   an OR gate inserted between said monostable multivibrator and said indicator means, said OR gate having input connections to said comparator means for extending the operation of said indicator means beyond the end of said monitoring pulse upon continued presence of an output voltage exceeding said reference voltage.

2. A system as defined in claim 1 wherein said indicator means comprises a lamp.

3. A system as defined in claim 1, further comprising meter means connected to said receiver means for measuring the magnitudes of said output voltages.

4. A system as defined in claim 3 wherein said meter means comprises a moving-coil instrument.

5. A system as defined in claim 3, further comprising switchover means connected to said receiver means for varying the sensitivity thereof.

6. A system as defined in claim 5 wherein said switchover means is connected to said threshold means for modifying the magnitude of said reference voltage commensurately with the variations in said sensitivity.

7. A system as defined in claim 3 wherein said meter means comprises a pointer and a scale, said reference voltage having a value corresponding to a point near the beginning of said scale.

* * * * *